United States Patent [19]
Tomasello

[11] Patent Number: 5,695,344
[45] Date of Patent: Dec. 9, 1997

[54] DEVICE FOR DEMONSTRATING DYNAMICS OF ORBITING BODIES

[76] Inventor: James Tomasello, 4801 Ridgebury, Lyndhurst, Ohio 44124-1126

[21] Appl. No.: 717,369

[22] Filed: Sep. 23, 1996

[51] Int. Cl.$^6$ ................................................ G09B 23/06
[52] U.S. Cl. ................................ 434/281; 434/291
[58] Field of Search .................... 434/281, 290, 434/291, 292, 293, 294, 284, 282

[56] References Cited

U.S. PATENT DOCUMENTS

| | | |
|---|---|---|
| D. 334,773 | 4/1993 | Simpson . |
| 2,477,179 | 7/1949 | Hart .................................. 434/281 |
| 2,516,418 | 7/1950 | Ramsay ............................. 434/281 |
| 3,196,558 | 7/1965 | Webb ................................. 434/291 |
| 3,287,832 | 11/1966 | Baerg ................................ 434/291 |
| 3,406,972 | 10/1968 | Wong ................................. 434/281 |
| 3,520,073 | 7/1970 | Baader . |
| 3,706,141 | 12/1972 | McGraw . |
| 3,733,720 | 5/1973 | Byers ................................. 434/291 |
| 3,750,308 | 8/1973 | Nelson . |
| 3,835,554 | 9/1974 | Mast .................................. 434/293 |
| 3,866,337 | 2/1975 | Burns ................................. 434/281 |
| 4,099,339 | 7/1978 | Snelson .............................. 434/281 |
| 4,400,162 | 8/1983 | Rustemis ............................ 434/291 |
| 4,713,011 | 12/1987 | Alnafissa . |
| 4,747,780 | 5/1988 | Tzeng . |
| 4,810,197 | 3/1989 | Hicks ................................. 434/281 |
| 5,114,348 | 5/1992 | Tzeng . |

FOREIGN PATENT DOCUMENTS

| 480689 | 5/1953 | Italy ................................. 434/293 |
|---|---|---|

*Primary Examiner*—Paul J. Hirsch
*Attorney, Agent, or Firm*—Joseph H. Taddeo

[57] ABSTRACT

A motorized scientific demonstrator that simulates the theoretical structure of an atom of various modeled molecules by demonstrating the rotational motion of the electron orbits by being deflected magnetically. Bohr's theoretical atom, which show the placement of the electrons in their respective K, L, M, N, O, P, Q shells, simulate the rotational movement of the electron orbits.

19 Claims, 7 Drawing Sheets

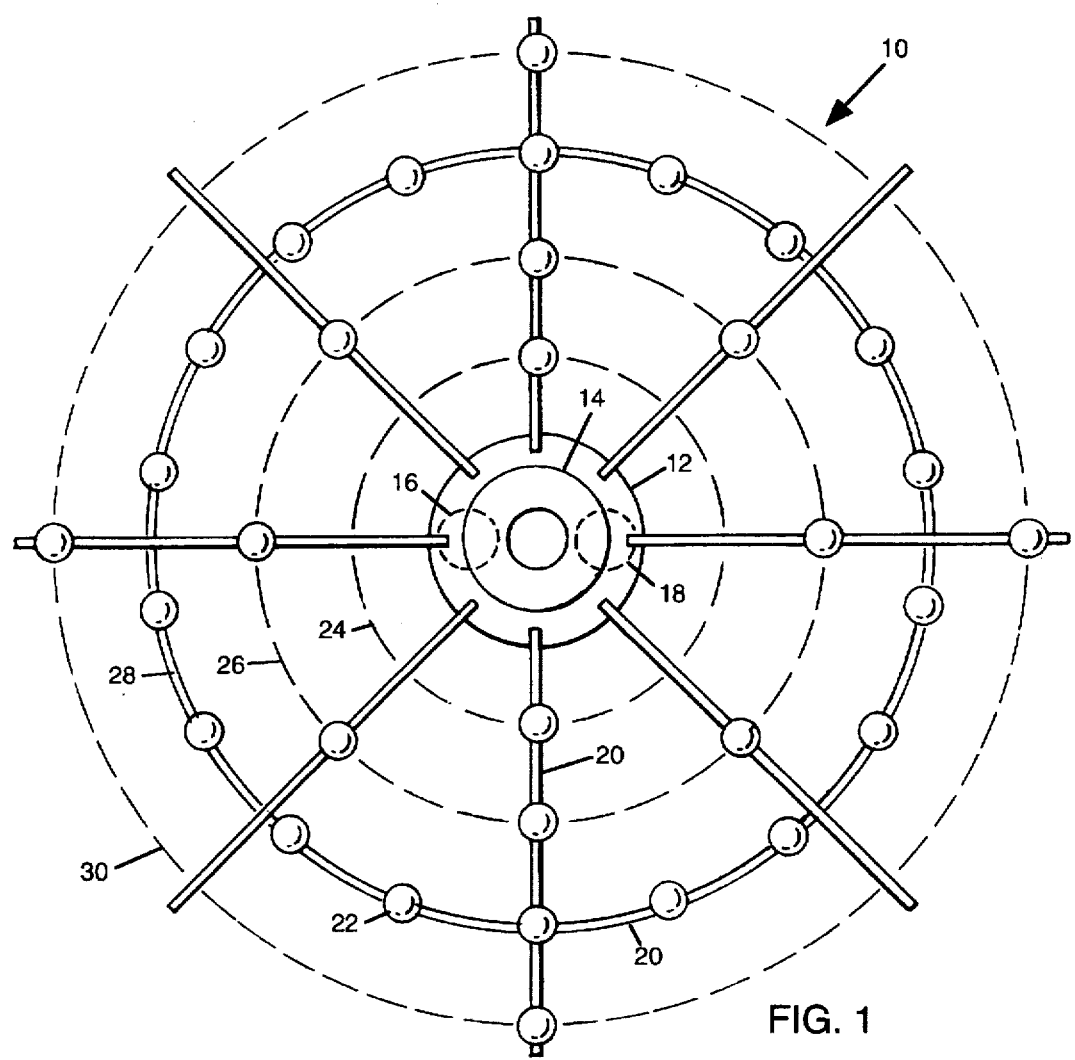
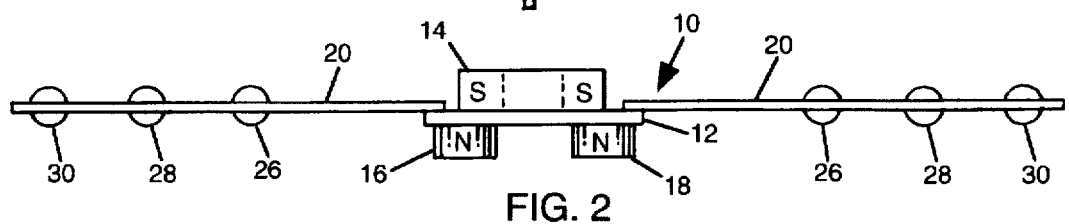

DEVICE FOR DEMONSTRATING DYNAMICS OF ORBITING BODIES

FIELD OF INVENTION

The present invention relates to a scientific demonstrator, and more particularly to motorized simulator that typifies the theoretical structure of an atom of various modeled molecules by demonstrating the electron orbits while being deflected magnetically.

BACKGROUND OF THE INVENTION

In the 5th cent. B.C. the Greek philosophers Democritus and Leucippus proposed that matter was made up of tiny, indivisible particles in constant motion. Aristotle, however, did not accept the theory, and it was ignored for centuries. Modern atomic theory began with the publication in 1808 by John Dalton of his experimental conclusions that all atoms of an element have exactly the same size and weight, and that atoms of elements unite chemically in simple numerical ratios to form compounds. In 1911, Ernest Rutherford explained an atom's structure in terms of a positively charged nucleus surrounded by negatively charged electrons orbiting around it. In 1911, Niels Bohr used quantum theory to explain why electrons could remain in certain allowed orbits without radiating energy.

The atom may be considered as the smallest particle into which matter can be broken up by chemical means. Though atoms can be further broken up into electrons, protons, neutrons, etc., by methods of modern physics, they retain their individuality in chemical reactions and are used as fundamental units in the organization of theory and facts of chemistry.

According to Bohr, the atom is built up of two units—a positively charged nucleus and a number of negatively charged electrons. The nuclear positive charge is equal to the atomic number while the mass is equal to the atomic weight. The electrons have a negative unit charge and a negative mass ($1/1840$ of the lightest nucleus). The number of electrons is equal to the charge on the nucleus measured in electron units of electrical charge, thus making the atom as a whole electrically neutral. The atom is essentially hollow with its mass concentrated at the nucleus and a cloud of orbital electrons revolving around it at various distances. On the basis of chemical and spectroscopic evidence these electrons are classified into shells called the K, L, M, N, O, P, Q shells. The following table gives the arrangement of the electrons among the electron shells for the various atoms.

| Atomic Number of Element | K | L | M | N | O | P | Q |
|---|---|---|---|---|---|---|---|
| 1 Hydrogen | 1 | | | | | | |
| 2 Helium | 2 | | | | | | |
| 3 Lithium | 2 | 1 | | | | | |
| 4 Beryllium | 2 | 2 | | | | | |
| 5 Boron | 2 | 3 | | | | | |
| 6 Carbon | 2 | 4 | | | | | |
| 7 Nitrogen | 2 | 5 | | | | | |
| 8 Oxygen | 2 | 6 | | | | | |
| 9 Fluorine | 2 | 7 | | | | | |
| 10 Neon | 2 | 8 | | | | | |
| 11 Sodium | 2 | 8 | 1 | | | | |
| 12 Magnesium | 2 | 8 | 2 | | | | |
| 13 Aluminum | 2 | 8 | 3 | | | | |
| 14 Silicon | 2 | 8 | 4 | | | | |
| 15 Phosphorus | 2 | 8 | 6 | | | | |
| 17 Chlorine | 2 | 8 | 7 | | | | |
| 18 Argon | 2 | 8 | 8 | | | | |
| 19 Potassium | 2 | 8 | 8 | 1 | | | |
| 20 Calcium | 2 | 8 | 8 | 2 | | | |
| 21 Scandium | 2 | 8 | 9 | 2 | | | |
| 22 Titanium | 2 | 8 | 10 | 2 | | | |
| 23 Vanadium | 2 | 8 | 11 | 2 | | | |
| 24 Chromium | 2 | 8 | 12 | 2 | | | |
| 25 Manganese | 2 | 8 | 13 | 2 | | | |
| 26 Iron | 2 | 8 | 14 | 2 | | | |
| 27 Cobalt | 2 | 8 | 15 | 2 | | | |
| 28 Nickel | 2 | 8 | 16 | 2 | | | |
| 29 Copper | 2 | 8 | 18 | 2 | | | |
| 30 Zinc | 2 | 8 | 18 | 2 | | | |
| 31 Gallium | 2 | 8 | 18 | 3 | | | |
| 32 Germanium | 2 | 8 | 18 | 4 | | | |
| 33 Arsenic | 2 | 8 | 18 | 5 | | | |
| 34 Selenium | 2 | 8 | 18 | 6 | | | |
| 35 Bromine | 2 | 8 | 18 | 7 | | | |
| 36 Krypton | 2 | 8 | 18 | 8 | | | |
| 37 Rubidium | 2 | 8 | 18 | 8 | 1 | | |
| 38 Strontium | 2 | 8 | 18 | 8 | | | |
| 39 Yttrium | 2 | 8 | 18 | 9 | 2 | | |
| 40 Zirconium | 2 | 8 | 18 | 10 | 2 | | |
| 41 Niobium | 2 | 8 | 18 | 12 | 1 | | |
| 42 Molybdenum | 2 | 8 | 18 | 13 | 1 | | |
| 43 Masurium | 2 | 8 | 18 | 13 | 2 | | |
| 44 Ruthenium | 2 | 8 | 18 | 15 | 1 | | |
| 45 Rhodium | 2 | 8 | 18 | 16 | 1 | | |
| 46 Palladium | 2 | 8 | 18 | 18 | | | |
| 47 Silver | 2 | 8 | 18 | 18 | 1 | | |
| 48 Cadmium | 2 | 8 | 18 | 18 | 2 | | |
| 49 Indium | 2 | 8 | 18 | 18 | 3 | | |
| 50 Tin | 2 | 8 | 18 | 18 | 4 | | |
| 51 Antimony | 2 | 8 | 18 | 18 | 5 | | |
| 52 Tellurium | 2 | 8 | 18 | 18 | 6 | | |
| 53 Iodine | 2 | 8 | 18 | 18 | 7 | | |
| 54 Xenon | 2 | 8 | 18 | 18 | 8 | | |
| 55 Cesium | 2 | 8 | 18 | 18 | 8 | 1 | |
| 56 Barium | 2 | 8 | 18 | 18 | 8 | 2 | |
| 57 Lanthenum | 2 | 8 | 18 | 18 | 9 | 2 | |
| 58–71 Cerium to Luthecium | 2 | 8 | 18 | 19–32 | 9 | 2 | |
| 72 Hafnium | 2 | 8 | 18 | 32 | 10 | 2 | |
| 73 Tantalum | 2 | 8 | 18 | 32 | 11 | 2 | |
| 74 Tungsten | 2 | 8 | 18 | 32 | 12 | 2 | |
| 75 Rhenium | 2 | 8 | 18 | 32 | 13 | 2 | |
| 76 Osmium | 2 | 8 | 18 | 32 | 14 | 2 | |
| 77 Iridium | 2 | 8 | 18 | 32 | 15 | 2 | |
| 78 Platinum | 2 | 8 | 18 | 32 | 16 | 2 | |
| 79 Gold | 2 | 8 | 18 | 32 | 18 | 1 | |
| 80 Mercury | 2 | 8 | 18 | 32 | 18 | 2 | |
| 81 Thallium | 2 | 8 | 18 | 32 | 18 | 3 | |
| 82 Lead | 2 | 8 | 18 | 32 | 18 | 4 | |
| 83 Bismuth | 2 | 8 | 18 | 32 | 18 | 5 | |
| 84 Polonium | 2 | 8 | 18 | 32 | 18 | 6 | |
| 85 — | 2 | 8 | 18 | 32 | 18 | 7 | |
| 86 Radon | 2 | 8 | 18 | 32 | 18 | 8 | |
| 87 — | 2 | 8 | 18 | 32 | 18 | 8 | 1 |
| 88 Radium | 2 | 8 | 18 | 32 | 18 | 8 | 2 |
| 89 Actinium | 2 | 8 | 18 | 32 | 18 | 9 | 2 |
| 90 Thorium | 2 | 8 | 18 | 32 | 18 | 10 | 2 |
| 91 Protactinium | 2 | 8 | 18 | 32 | 18 | 11 | 2 |
| 92 Uranium | 2 | 8 | 18 | 32 | 18 | 12 | 2 |

The inert gases occupy a unique position in the table in that the outer shell of electrons contains two electrons in the case of helium and eight in the case of the other inert gases. An outer shell of eight electrons is therefore correlated with chemical inertness. This correlation can be further extended to the other groups of the periodic table where we find in the same group of the periodic table the same arrangement of the electrons in the outer shell of all members of the group. In this way the chemical characteristics of an atom are associated with the number of electrons in the outer shell.

U.S. Pat. No. 5,114,348, granted May 19, 1992, to S. Tzeng, discloses a tutorial device for observing the lunar phase. A base sheet is inscribed with a time scale, a ring of moon pictures and a ring of moon phases. Outer circles on the base sheet define the months and times of moonrise, moonset, and moonsharp.

U.S. Pat. No. 4,747,780, granted May 31, 1988, to S. Tzeng, discloses a multi-globe system including the sun, the earth, and the moon. It illustrates the revolution relation among the earth, the sun and the moon for teaching purposes.

U.S. Pat. No. 4,713,011, granted Dec. 15, 1987, to F. A. Alnafissa, teaches of an apparatus for simulating a large scale, rotating representation of the solar system inner planets and the sun. The apparatus is intended to be used as an educational tool in museums, in public displays and the like.

U.S. Pat. No. 3,835,554, granted Sep. 17, 1974, to J. B. Mast, discloses an improved space mechanical simulator having a sun model, an earth model, and a moon model mounted to demonstrate the movement of each relative to the other.

U.S. Pat. No. 3,750,308, granted Aug. 7, 1973, to D. E. Nelson, teaches of an educational demonstration model for demonstrating the principles of balance and the center of gravity, and the principles of the movement of the sun, the revolution of the earth around the sun, and the revolution of the moon around the earth.

Other apparatuses designed to demonstrate the various aspects of rotational electron movement were disclosed in U.S. Pat. No. 3,866,337 issued Feb. 18, 1975, to T. D. Burns, and in U.S. Pat. No. 3,706,141, issued Dec. 19, 1972, to T. F. McGraw, for example.

Several of the above referenced prior art patents disclose apparatuses that demonstrate the principles of planetary motion within our galaxy where the movement of the planets are virtually coplanar, while others demonstrate the theoretical structure of an atom.

SUMMARY OF THE INVENTION

The present invention finds particular application as an educational demonstrator that simulates the theoretical motion of the electron orbits of the atomic structure of various elements. For example, the K, L, M, N, shells of Germanium are 2, 8, 18, 4, respectively, and the shells of Magnesium are 2, 8, 2.

In the present embodiment, a clock motor rotating at a speed that ranges between 440 and 592 RPM, is used as a means of rotating the various electron models. However, in the preferred embodiment a synchronous constant speed motor is used to drive the modeled atoms. In an alternative embodiment, a hysteresis synchronous motor that is coupled to the drive shaft with an elastomeric belt, offers a system that is independent of changes in loading, as well as, a system that is impervious to changes in line frequency.

Mounted to the top of the motor drive shaft is a steel bar, upon which are mounted two magnetic structures. These two rotating magnets provide the magnetic coupling to drive the electron models.

Attached directly above the motor drive shaft is a non-magnetic support rod, preferably made of brass, that is in axial alignment with the principal drive shaft. Mounted on the support rod slightly above the area where each individual model is positioned, is a thick steel washer, upon which is mounted a fixed magnet that completes the magnetic path of the rotating magnetic field.

Each model is constructed of a thin flat steel washer that has a large diameter hole, typically ⅜" in diameter. Fixed to one side of the flat washer is a large flat magnet that has a ⅜" diameter hole through it. Mounted to the opposite side near the outer edges of the flat washer are two small magnets.

An array of thin wires that are attached to the Washer and project radially from the washer, support colored beads that represent the electrons. Each bead is colored with a highly visible iridescent paint to enhance the viewing when the model is being rotated. The inner most shell, K (consisting of two electrons), is colored in an iridescent orange, the next shell, L, is colored an iridescent red, the M shell, an iridescent green, then yellow, and so on.

In typical operation, the user inserts the model to be viewed into the lower position of the support shaft, then energizes the electric motor. The rotation of the drive shaft subsequently drives the magnetic impeller that is attached to the end of the drive shaft, causing a rotating magnetic field. Intermediate the rotating fixed magnet and the rotating magnets is the modeled atom structure. The rotating magnetic field is coupled into the magnets mounted to the atomic model, causing it to rotate in a wobbling manner of precession, perturbating freely, giving the illusion of the multiple orbital paths taken by each electron in their respective shell.

A black shrouded backdrop enhances the viewing contrast.

It is an object of this invention to provide for an educational demonstrator that simulates the electron orbits for various elements, showing their atomic structure.

It is another object of this invention to provide for an educational demonstrator that creates orbital electron paths that appear elliptical in a random distribution.

It is still another object of this invention to provide for an educational demonstrator that illustrates the relation between the various electron shells, as the electron rotate about its central nucleus.

Yet, it is another object of this invention to provide for an educational demonstrator that is driven by a synchronous motor to drive the simulation system.

It is a final object of this invention to provide for an educational demonstrator that magnetically couples the drive through the model to a fixed magnetic structure, thereby causing a rotating magnetic field, whereby the model rotates in a perturbationally random-like manner, simulating the theoretical electron orbital paths.

These and other advantages of the present invention will become more apparent to those skilled in the art upon reading the following detailed description when applied in conjunction with the drawings where it is shown and described illustratively the preferred embodiment of the invention.

BRIEF DESCRIPTION OF THE DRAWINGS

The invention is illustrated in the following drawings attached herein.

FIG. 1 is the top elevation of a theoretical model of the Germanium atom, where the shells are 2, 8, 18, 4, representing the K, L, M, N shells. The atomic structure shown is a typical arrangement for other modeled atoms.

FIG. 2 is the side elevation of a theoretical model of a typical Germanium atom.

DESCRIPTION OF THE PREFERRED EMBODIMENT

Figure 3:
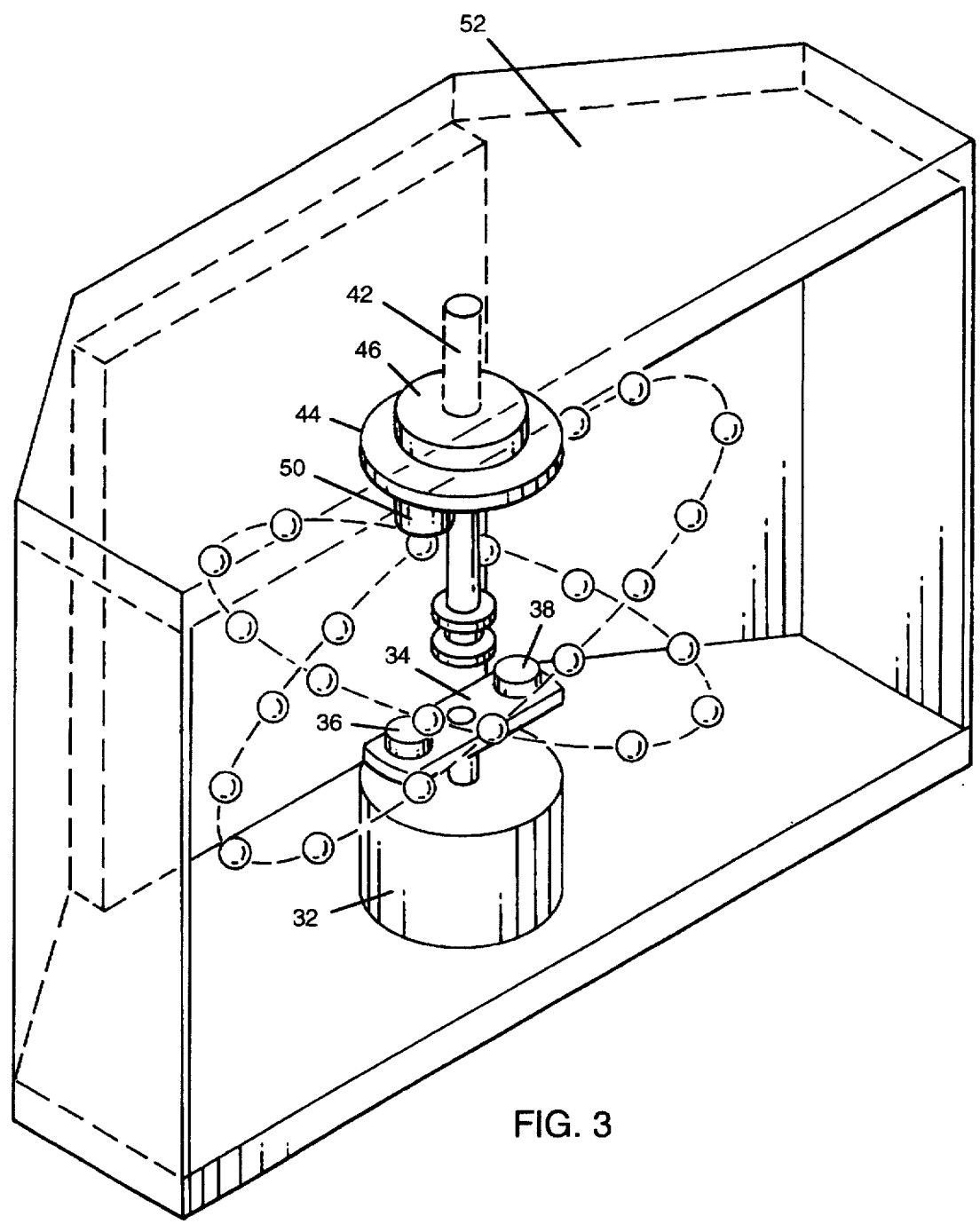
FIG. 3 is a perspective view of the motorized educational demonstrator that simulates the theoretical electron orbits of various atomic structures by magnetically driving the modeled atoms.

Referring more specifically to the drawings, the model of a typical theoretical atom is shown in FIGS. 1 and 2. The typical theoretical atom illustrated, 10, is an atom of Germanium, where the K, L, M, N shells are 2, 8, 18 and 4, respectively.

The Germanium model 10 is constructed of a thin flat steel washer 12 that has a large diameter hole, typically ⅜" in diameter. Affixed to one side of flat washer 12 is a large flat magnet 14 that has a ⅜" diameter hole through it. Mounted to the opposite side near the outer edges of the flat washer are two small magnets 16 and 18.

An array of thin wires 20 are attached to the washer and project radially from the washer. These wires support colored beads that represent the various electrons 22. Each bead is colored with a highly visible iridescent paint to enhance the viewing when the model is being rotated. The inner most shell 24, K (consisting of two electrons), is colored in an iridescent orange, the next shell 26, L, is colored an iridescent red, the M shell 28, an iridescent green, then iridescent yellow, 30, and so on.

Figure 4:
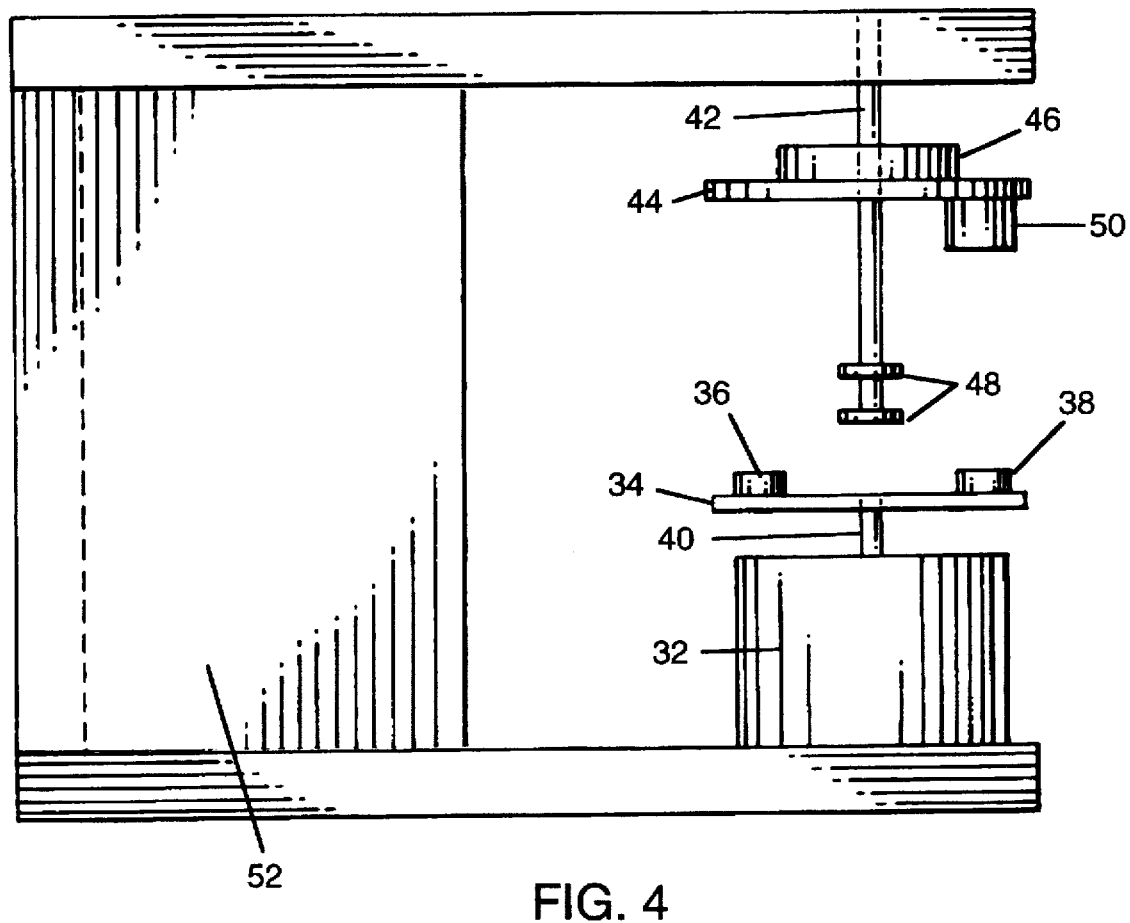
FIG. 4 is a side elevation of the motorized educational demonstrator that simulates the theoretical electron orbits of various atomic structures by magnetically driving the modeled atoms.
Figure 5:
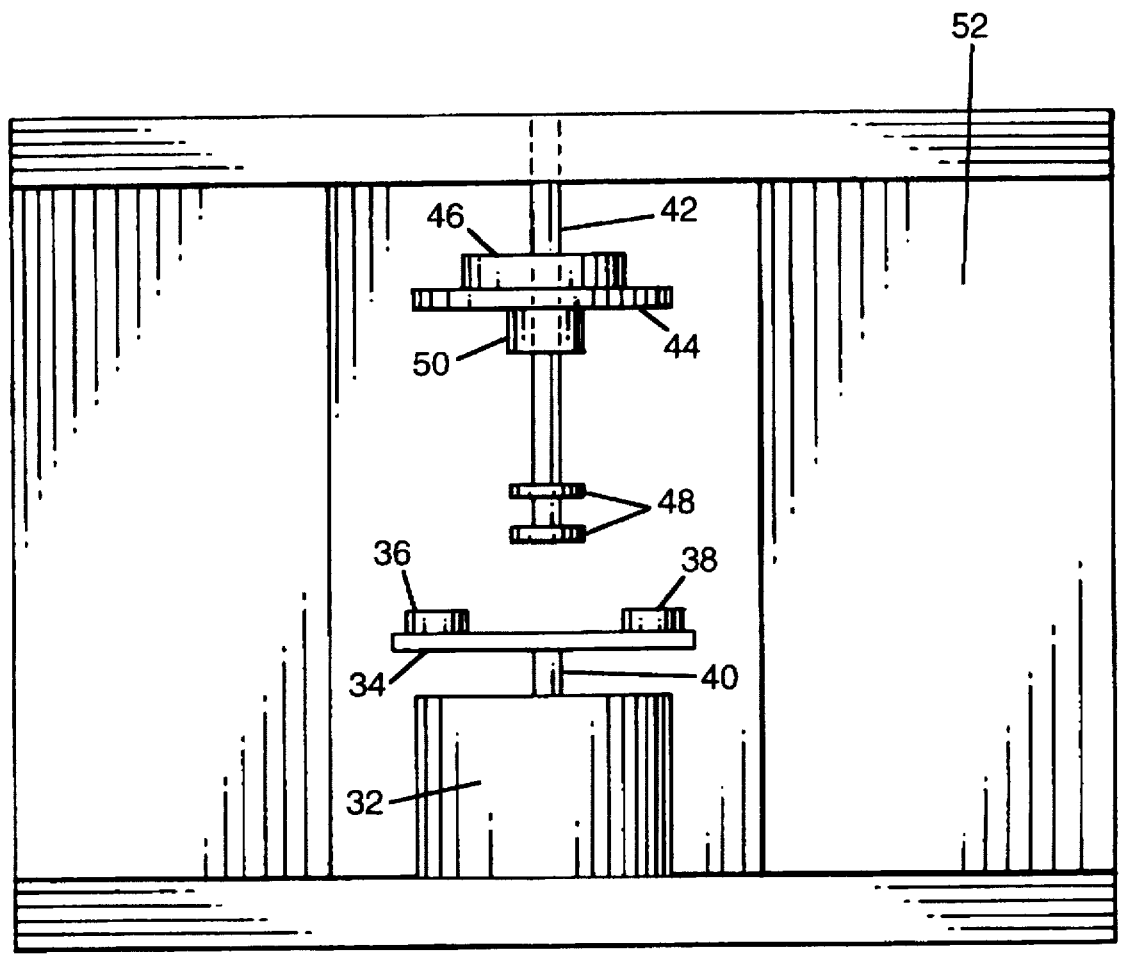
FIG. 5 is a front elevation of the motorized educational demonstrator without the theoretical atomic structured model mounted.

Turning now to FIG. 4, and FIG. 5, which are a side elevational view and a from view respectively, of the educational demonstrator without the model of the atom inserted. A synchronous motor 32, rotating at a constant speed that ranges between 440 and 592 RPM, is used as a means of rotating the various individual electron models. If a greater speed accuracy is needed, a hysteresis synchronous constant speed motor can be used as an alternative embodiment. In still another embodiment, a hysteresis synchronous motor that is coupled to the drive shaft with an elastomeric belt, offers a system that is independent of changes in loading, as well as, a system that is impervious to changes in line frequency.

Mounted to the top of the motor drive shaft 40 is a steel bar 34, upon which are mounted two magnetic structures, 36 and 38. These two rotating magnets provide the magnetic coupling to rotate and drive the electron models.

Figure 6:
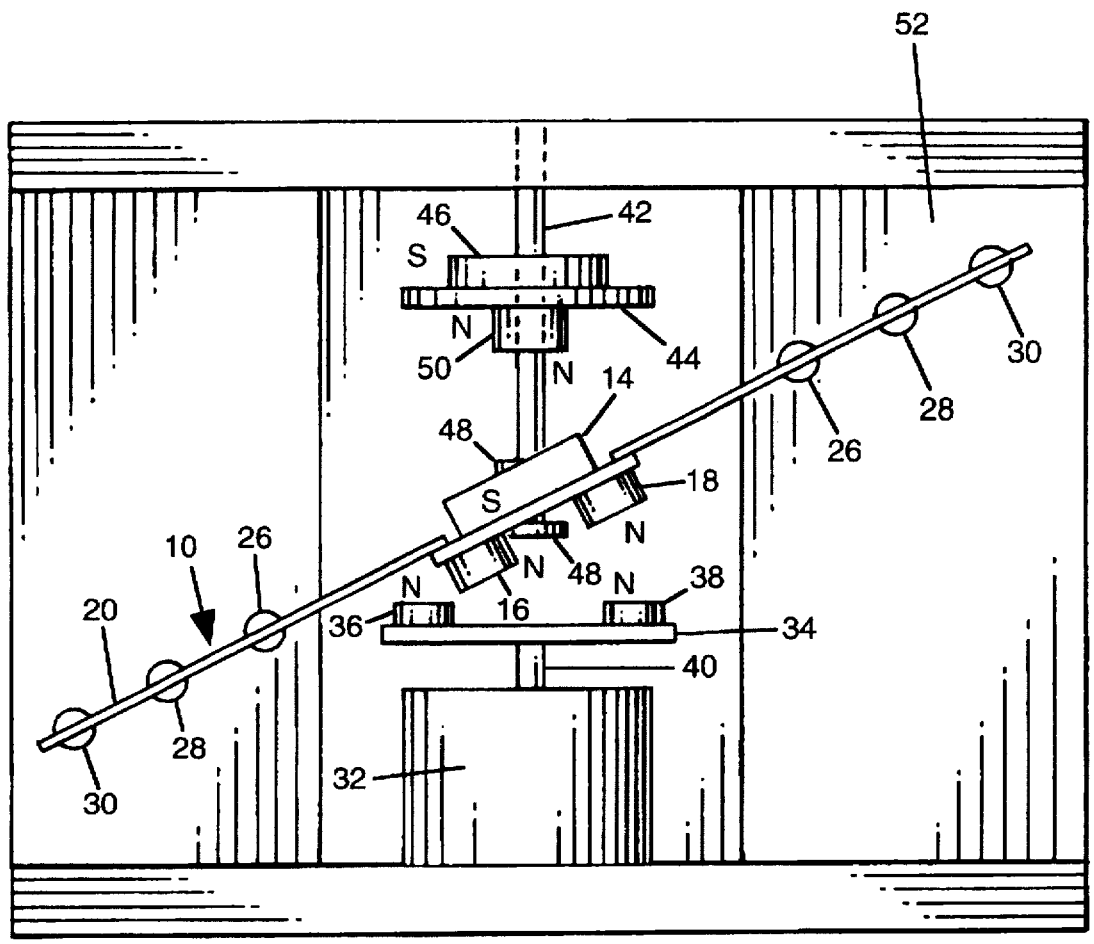
FIG. 6 is a front elevation of the motorized educational demonstrator with the theoretical atomic structured model mounted, while being stationary.
Figure 7:
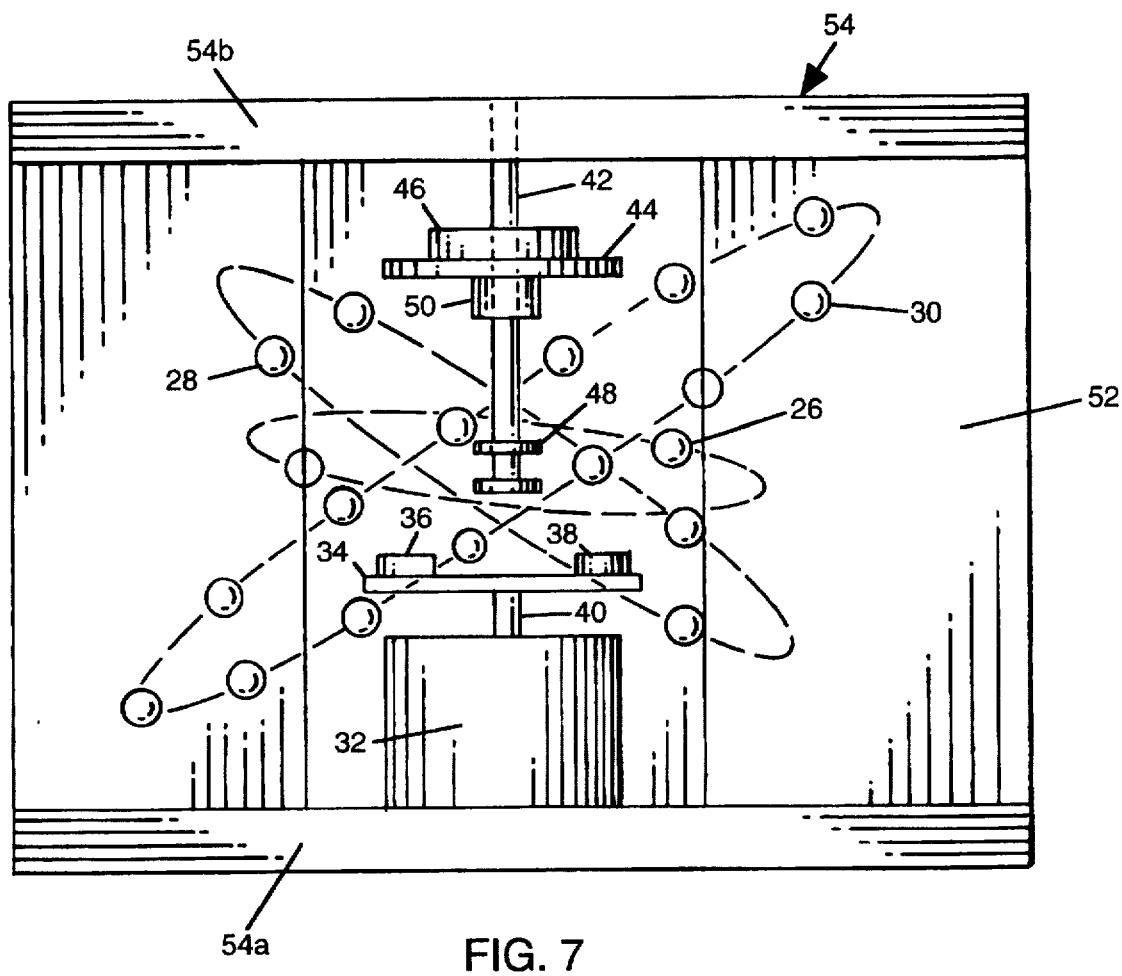
FIG. 7 is a front elevation of the motorized educational demonstrator with the theoretical atomic structured model mounted, rotating, while being magnetically driven.

Attached directly above the motor drive shaft 40 is a non-magnetic support rod 42, preferably made of brass, that is in axial alignment with the principal drive shaft 40. Mounted on the support rod 42 slightly above the area where each individual model is positioned, is a thick steel washer 44, upon which is mounted a fixed magnet 46, which completes the magnetic path of the rotating magnetic field. Another fixed magnet 50, when mounted centrally on the bottom of steel washer 44, as shown in FIG. 5, FIG. 6 and FIG. 7, allows the plane of the model to rotate about the rod while its peripheral edge fluctuates vertically. Whereas, when fixed magnet 50 is mounted off-center on the lower surface of steel washer 44, as in FIG. 3 and FIG. 4, rotation of the model provides multiple stationary orbits around a single axle, the support rod.

Found near the bottom of support rod 42 is a hub 48, comprised of two radially extending regions forming an annular concavity to that support and guide the model as it rotates, allowing the model to perturbate freely as shown in FIG. 3. Then in FIG. 6, the model of the atom 10 is shown mounted in position, but without the motor being energized.

In typical operation, the user inserts the model to be viewed 10 into the lower position of the support shaft hub 48, then energizes the electric motor 32. The rotation of the motor drive shaft 40 subsequently drives the magnetic impeller, comprised of rotating steel bar 34 and cylindrical magnets 36 and 38, that is attached to the end of the drive shaft, causing the magnetic field to rotate. Intermediate the rotating fixed magnet and the rotating magnets is the modeled atomic structure 10. The rotating magnetic field is coupled into the magnets mounted to the atom model, causing it to rotate in a wobbling manner of precession, perturbating freely, giving the illusion of the multiple orbital paths taken by each electron in their respective shell.

Figure 8:
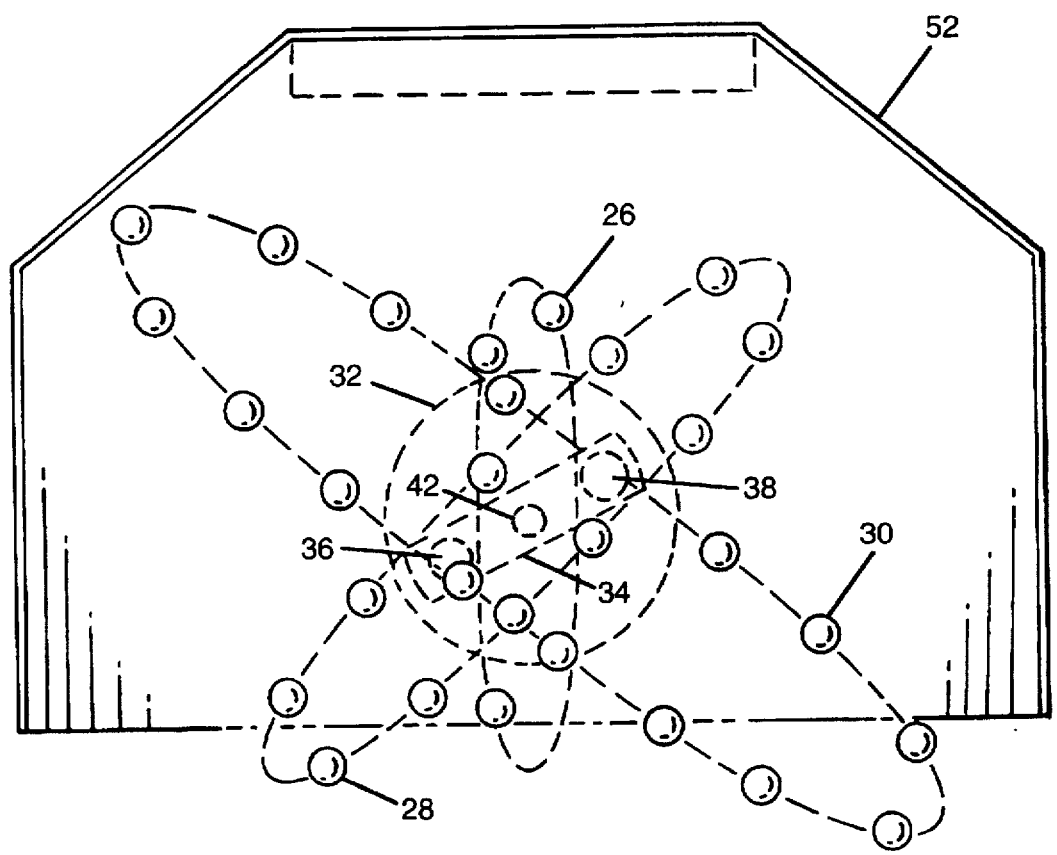
FIG. 8 is a top elevation of the motorized educational demonstrator with the theoretical atomic structured model mounted, rotating, while being magnetically driven.

FIGS. 7 and 8 best shows the elliptical orbits that are taken when the motor is energized and the model 10 is being rotated within the magnetic field and centralized about hub 48. Each and every modeled atom produces the perturbating elliptical orbital paths that are taken by the various electrons within their respective shells.

As seen in FIG. 7, the device is secured on a base 54, with a floor 54a and top frame 54b which are interconnected by wall or backdrop 52. The black shrouded backdrop 52 enhances the viewing contrast of the iridescent colored rotating beads, thereby simulating the apparent paths taken by the electrons in orbit.

The polarity and positioning of each magnet is critical for the optimum performance. The polarity of fixed magnet 46 is such that "S" is located on the upper side of the magnet. It in turn coacts with magnet 14, whose upper side is "S," to act as an anti-gravitational device for the model that is inserted into position. Magnets 16 and 18, are repelled by magnets 36 and 38, so that as magnets 36 and 38 rotate, act to repel magnets 16 and 18, causing the model to be propelled in a circular path. Magnet 50, when positioned centrally on the support rod 42, further distorts the magnetic field as the model 10 rotates to cause the model to perturbate, thereby generating orbital paths in a random-like manner.

In another aspect of this invention, magnet 50 can be removed, and a model of the sun's planetary system inserted to simulate the motion of the planets about the sun.

It should be obvious to those skilled in the art that other substitutions in materials or alterations in dimensions can be made without departing from the spirit of the invention.

I claim:

1. A demonstrator device for simulating the naturally occurring dynamics of orbiting bodies by creating a plurality of orbits that appear as elliptical, random revolutions of the bodies perturbating freely about a central nucleus, the device comprising:

a base having an interconnected top frame and a floor;

a drive means fixed to the base floor;

an upward extending rotatable drive shaft articulating with the drive means, the drive shaft culminating in an upper terminal end;

a support rod, in axial alignment with the drive shaft, extending downward from the top frame to a bottom end, the rod having a hub mounted on the bottom end, the hub comprising two radially extending regions surrounding an annular concavity; the rod further comprising a fixed magnetic structure positioned on the rod between the top frame and the hub;

a disc shaped model comprising a flat center piece with a hole therethrough, the model adapted to be loosely installed in the concavity of the hub to freely rotate about the hub; an array of interconnected thin wires that project radially outward from the center piece; and, a plurality of beads mounted on the wires, each bead of the plurality positioned at a predetermined radial point from the center piece, such that upon rotation of the model, the rotating beads form a plurality of radial orbits surrounding the center piece for representation of bodies that orbit around a central nucleus; and, at least one magnet associated with the center piece;

a magnetic means for rotating the electron model associated with the shaft, the magnetic means having a surrounding magnetic field which extends through the at least one magnet of the model center piece to the fixed magnetic structure on the rod, whereby upon rotation of the magnetic means and consequent rotation of its surrounding magnetic field, the model is magnetically impelled to rotate in a plurality of stationary orbits on the rod to simulate the revolutions of bodies about a nucleus.

2. A demonstrator device according to claim 1, wherein the model is a planar element which lies in a plane.

3. A demonstrator device according to claim 2, wherein each bead of the plurality of beads of the model is colored with an iridescent paint to enhance viewing when the model is being rotated.

4. A demonstrator device according to claim 3, wherein the number of beads and orbits formed by the beads when the model rotates, is adapted to correspond to a respective number of electrons and electron shells of a particular atom that forms an element, for demonstrating an atomic structure for a particular element in a periodic table of elements.

5. A demonstrator device according to claim 3, wherein the model is constructed in conformity with a sun's planetary system and upon insertion in the rotating magnetic field of the device, rotation of the model simulates the motion of the planets about the sun.

6. A demonstrator device according to claim 4 wherein each bead of the plurality of beads in a particular orbit of the plurality of orbits formed by rotation of a model is the same color, whereby the rotating model demonstrates the atomic structure and relation between electron shells of an atom.

7. A demonstrator device according to claim 6, wherein said magnetic means for rotating further comprises a steel bar mounted to the upper shaft end for rotation with the shaft, the bar having first and second ends, upper and lower surfaces, with a magnetic structure mounted on the upper surface of each of the bar ends, the bar and magnets comprising a magnetic impeller.

8. A demonstrator device according to claim 7, wherein the fixed magnetic structure of the rod further comprises a thick steel washer with upper and lower surfaces mounted on the support rod between the top frame, and the hub, the washer having a fixed magnet on the upper surface thereof that couples a magnetic field between the washer and the bar.

9. A demonstrator device according to claim 8, wherein the fixed magnetic structure of the rod further comprises a perturbation magnet mounted centrally on the lower surface of the steel washer, thereby allowing the plane of the model to rotate about the rod while its peripheral edge fluctuates vertically and perturbates freely on the hub, thereby generating orbital paths in a random-like manner.

10. A demonstrator device according to claim 8, wherein the fixed magnetic structure of the rod further comprises a perturbation magnet mounted off-center on the lower surface of steel washer, whereby rotation of the model provides multiple stationary orbits around the support rod.

11. A demonstrator device according to claim 10, wherein the drive means comprises a clock motor.

12. A demonstrator device according to claim 10, wherein the drive means comprises a synchronous constant speed motor.

13. A demonstrator device according to claim 10, wherein the drive means comprises a hysteresis synchronous motor that is coupled to the drive shaft with an elastomeric belt, whereby the drive means is independent of changes in loading and impervious to changes in line frequency.

14. A demonstrator device according to claim 10, wherein the model center piece comprises a flat steel washer with first and second surfaces and a peripheral edge radially surrounding the hole.

15. A demonstrator device according to claim 14, wherein the at least one magnet associated with the model center piece comprises a magnet fixed on the first surface surrounding the hole and two small magnets mounted on the second washer surface on the peripheral edge on opposite sides of the hole.

16. A demonstrator device according to claim 15, wherein the top frame and the floor of the base are interconnected by a darkly colored backdrop to enhance viewing of the iridescent rotating beads that simulate bodies in orbit about a nucleus.

17. A demonstrator device according to claim 16, wherein each magnet of the device has a polarity which is critical to optimum performance, and the polarity of the fixed magnet on the upper surface of the steel washer on the support rod is "S" on an upper side of the magnet, whereby it in mm coacts with the magnet fixed on the first model surface whose upper side is "S," to act as an anti-gravitational device for the model that is installed for rotation on the hub.

18. A demonstrator device according to claim 17, wherein the two small magnets on the second washer surface of the model, with polarity "N" facing downward to the impeller, are repelled by the magnetic structures fixed on the upper surface of each impeller bar end, with polarity "N" facing upward, so that as the impeller magnetic structures rotate they repel said small and cause the model to be propelled in a circular path.

19. A demonstrator device according to claim 18, wherein the polarity "N" of the perturbation magnet faces downward toward the model for coaction with magnets of the model to control orbits of the rotating model.

* * * * *